United States Patent [19]
Miyanabe et al.

[11] Patent Number: 6,134,211
[45] Date of Patent: Oct. 17, 2000

[54] CROSSTALK REMOVING DEVICE FOR USE IN RECORDED INFORMATION REPRODUCING APPARATUS

[75] Inventors: Shogo Miyanabe; Hiroki Kuribayashi, both of Tsurugashima, Japan

[73] Assignee: Pioneer Electronic Corporation, Tokyo, Japan

[21] Appl. No.: 09/166,529

[22] Filed: Oct. 6, 1998

[30] Foreign Application Priority Data

Oct. 7, 1997 [JP] Japan ..................................... 9-274220

[51] Int. Cl.$^7$ ....................................................... G11B 7/00
[52] U.S. Cl. ............................... 369/124.05; 369/124.02; 369/124.03; 369/124.11
[58] Field of Search .......................... 369/124.02, 124.03, 369/124.05, 124.11, 124.12, 59, 44.34, 124.14, 124.13

[56] References Cited

U.S. PATENT DOCUMENTS

| 5,280,466 | 1/1994 | Tomita | 369/44.26 |
| 5,495,460 | 2/1996 | Haraguchi et al. | 369/124.02 |
| 5,729,514 | 3/1998 | Horigome et al. | 369/124.02 |
| 5,835,467 | 11/1998 | Tomita et al. | 369/124.11 |

*Primary Examiner*—Thang V. Tran
*Attorney, Agent, or Firm*—Morgan, Lewis & Bockius LLP

[57] ABSTRACT

A crosstalk removing device for use in a recorded information reproducing apparatus which is free from malfunctions even if a read sample value sequence, which has been read from a recording medium and sampled, is out of synchronization, and can immediately proceed to a crosstalk removing operation after the read sample value sequence recovers the synchronization. When crosstalk from adjacent tracks is removed from the read sample value sequence, which has been read from a recording medium and sampled, to produce a crosstalk removed read sample sequence, filter coefficients are derived for converging an error value present in the crosstalk removed read sample value sequence to zero, and the read sample value sequence is filtered on the basis of the filter coefficients to derive crosstalk components from the adjacent tracks. The crosstalk components are subtracted from the read sample value sequence to derive the crosstalk removed read sample value sequence. In this event, when the read sample value sequence remains in an asynchronous state, the read sample value sequence is filtered on the basis of predetermined fixed coefficient values instead of the filter coefficient to derive crosstalk components from the adjacent tracks.

9 Claims, 14 Drawing Sheets

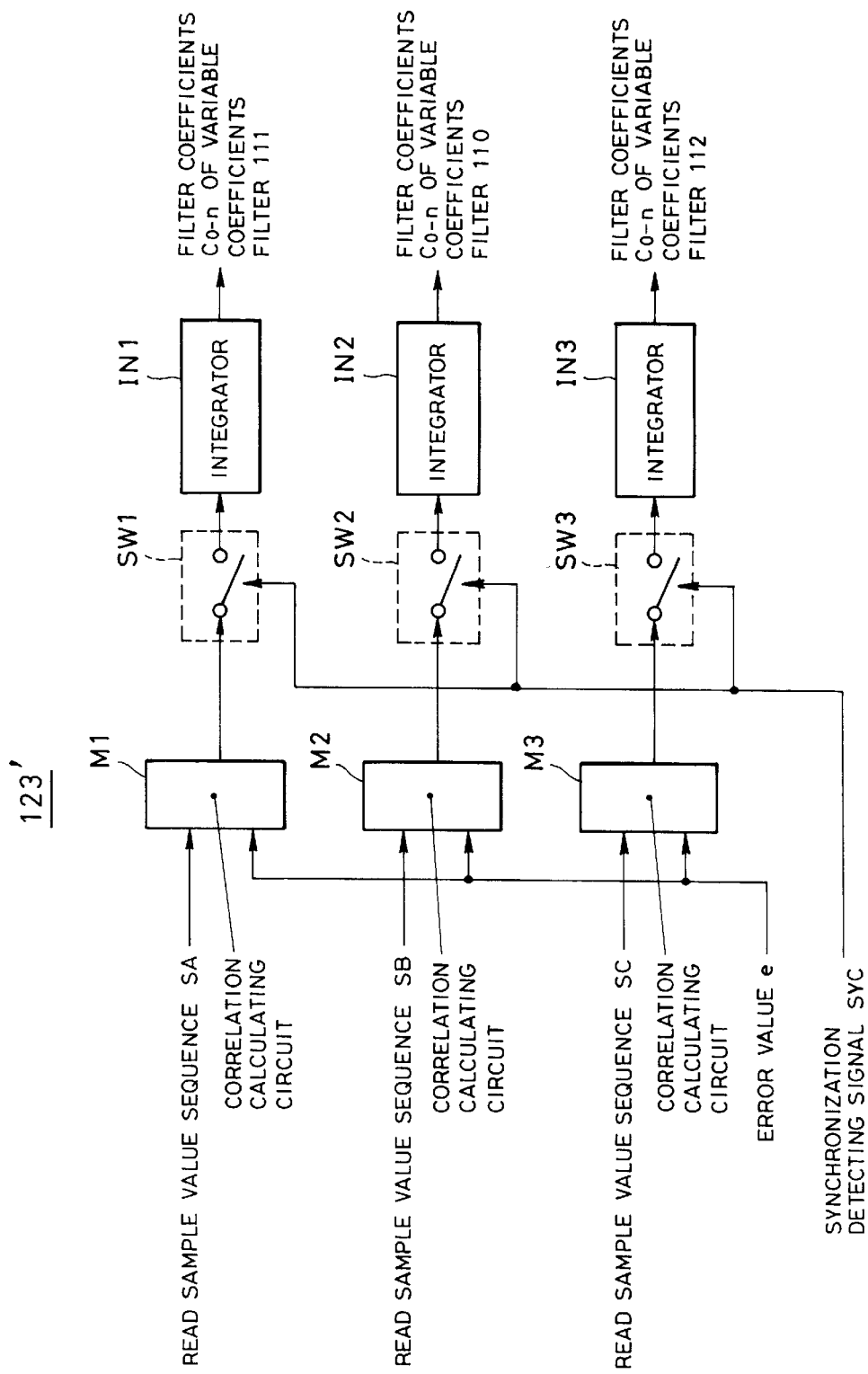

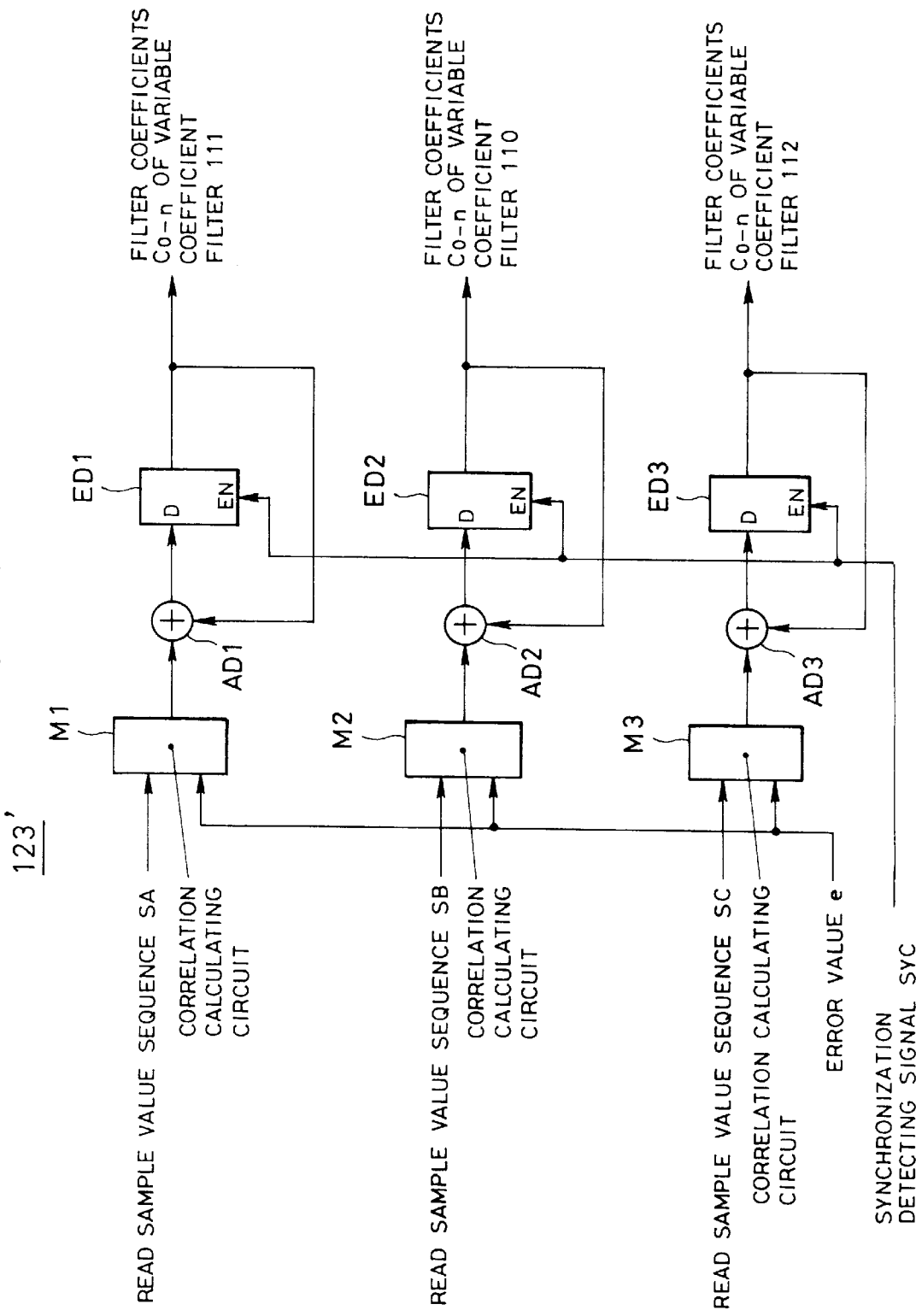

CROSSTALK REMOVING DEVICE FOR USE IN RECORDED INFORMATION REPRODUCING APPARATUS

BACKGROUND OF THE INVENTION

1. Field of the Invention

The present invention relates to a crosstalk removing device for use in a recorded information reproducing apparatus for removing crosstalk components from adjacent tracks, from a read signal read from a recording medium.

2. Description of Related Art

FIG. 1 illustrates the configuration of a recorded information reproducing apparatus.

Referring specifically to FIG. 1, a pickup 100 is equipped with three reading elements "a"–"c". The respective reading elements "a"–"c" simultaneously read recorded signals from three recording tracks formed adjacent to each other on a recording disc 3, and supply the resultant read signals to corresponding head amplifiers 4a–4c, respectively.

As illustrated in FIG. 2, when the reading element "b", for example, is reading recorded information from a recording track T on the recording disc 3 by irradiating the recording track T with a beam spot PB, the reading element "a" reads recorded information from a recording track (T+1), which is a track adjacent to the recording track T, by irradiating this recording track (T+1) with a beam spot PA. Also, in this event, the reading element "c" irradiates a recording track (T−1), which is another track adjacent to the recording track T, with a beam spot PC to read recorded information from the recording track (T−1).

The head amplifiers 4a–4c amplify the read signals respectively supplied from the reading elements "a"–"c" to respective desired levels, and supply the resultant amplified read signals to A/D converters 5a–5c, respectively. The A/D converters 5a–5c sequentially sample the amplified read signals corresponding thereto at the timing of a clock signal supplied thereto from a PLL circuit 10. The resultant read sample value sequences SA–SC are respectively supplied to a crosstalk removing circuit 40.

The PLL circuit 10 detects a phase error possibly implied in the read signal based on the read sample value sequence SB, and generates a clock signal having an oscillating frequency corresponding to the amount of a phase error, and supplies the clock signal to the A/D converters 5a–5c and the crosstalk removing circuit 40, respectively.

The crosstalk removing circuit 40 applies adaptive signal processing utilizing, for example, an LMS (least mean square) adaptive algorithm to the read sample value sequences SA–SC to produce a crosstalk removed read sample value sequence P, which is free from crosstalk components from both the tracks (T+1,T−1) adjacent to the track T, from the read sample value sequence SB read from the track T of FIG. 2.

A Viterbi decoder 30 produces the most likely binary reproduced data based on the crosstalk removed read sample value sequence P.

FIG. 3 is a block diagram illustrating an exemplary internal configuration of the crosstalk removing circuit 140.

Referring specifically to FIG. 3, variable coefficient filters 110, 111, 112 each comprise a transversal filter as illustrated in FIG. 4.

The illustrated transversal filter consists of serially connected n-stage D flip-flops D1–Dn for sequentially shifting and fetching read sample value sequences (SA, SB, SC); a coefficient multiplier M0 for multiplying the read sample value sequences by a filter coefficient $C_0$; coefficient multipliers M1–Mn for multiplying respective outputs of the D flip-flops D1–Dn by filter coefficients $C_1$–$C_n$, respectively; and an adder AD1 for adding the respective products from the coefficient multipliers M0–Mn and outputting the sum.

The variable coefficient filter 110 filters the read sample value sequence SB with filter coefficients $BC_0$–$BC_n$ supplied from a filter coefficient calculating circuit 123 to produce a read sample value sequence R which has inter-symbol interference removed therefrom, and supplies this read sample value sequence R to a subtractor 120. The variable coefficient filter 111 filters the read sample value sequence SA with filter coefficients $AC_0$–$AC_n$ supplied from the filter coefficient calculating circuit 123 to produce a crosstalk sample value sequence CR1 which corresponds to a crosstalk component from an adjacent track (the track T+1 in FIG. 2), and supplies this crosstalk sample value sequence CR1 to the subtractor 120. The variable coefficient filter 112 filters the read sample value sequence SC with filter coefficients $CC_0$–$CC_n$ supplied from the filter coefficient calculating circuit 123 to produce a crosstalk sample value sequence CR2 which corresponds to a crosstalk component from the other adjacent track (the track T−1 in FIG. 2), and supplies this crosstalk sample value sequence CR2 to the subtractor 120.

The subtractor 120 subtracts the crosstalk sample value sequences CR1, CR2 from the read sample value sequence R to produce the aforementioned crosstalk removed read sample value sequence P which is supplied to each of the Viterbi decoder 30 and a reference sample extracting circuit 130 in FIG. 1.

The reference sample extracting circuit 130 extracts a predetermined reference sample value from the crosstalk removed read sample value sequence P, sequentially supplied thereto from the subtractor 120, and supplies the predetermined reference sample value to a subtractor 140. For example, when the values of three successive sample sequences within the crosstalk removed read sample value sequence P transit from positive to negative or from negative to positive, the reference sample extracting circuit 130 extracts the central sample value of the three successive sample values, i.e., a sample value at zero-cross time, and supplies the extracted sample value to the subtractor 140. The subtractor 140 calculates the difference between the sample value extracted by the reference sample extracting circuit 130 and a predetermined reference value, and supplies the filter coefficient calculating circuit 123 with the difference as an error value "e". For example, when the reference sample extracting circuit 130 extracts a sample value at zero-cross time from the crosstalk removed read sample value sequence P, the reference value presents zero.

The filter coefficient calculating circuit 123 calculates filter coefficients $AC_0$–$AC_n$ based on the read sample value sequence SA and the error value "e", and supplies these filter coefficients $AC_0$–$AC_n$ to the variable coefficient filter 111 as filter coefficients $C_0$–$C_n$ for the variable coefficient filter 111. Likewise, the filter coefficient calculating circuit 123 calculates filter coefficients $BC_0$–$BC_n$ based on the read sample value sequence SB and the error value "e", and supplies these filter coefficients $BC_0$–$BC_n$ to the variable coefficient filter 110 as filter coefficients $C_0$–$C_n$ for the variable coefficient filter 110. Further, the filter coefficient calculating circuit 123 calculates filter coefficients $CC_0$–$CC_n$ based on the read sample value sequence SC and the error value "e", and supplies these filter coefficients $CC_0$–$CC_n$ to the variable coefficient filter 112 as filter coefficient $C_0$–$C_n$ for the variable coefficient filter 112. The filter coefficient calculating circuit 123 repetitively updates each of the filter coefficients $AC_0$–$AC_n$, $BC_0$–$BC_n$, $CC_0$–$CC_n$ based on an LMS (least mean square) adaptive algorithm such that the error value "e" converges to zero.

With the configuration as described above, the crosstalk removing circuit 40 first applies the read sample value sequence SB with adaptive signal processing utilizing the LMS adaptive algorithm to eliminate inter-symbol interference from the read signal read from the track T illustrated in FIG. 2 to produce a read sample value sequence R which is free from the inter-symbol interference. Further, the crosstalk removing circuit 40 applies the adaptive signal processing to the read sample value sequences SA, SC to produce crosstalk sample value sequences CR1, CR2 corresponding to crosstalk components from both the tracks adjacent to the track T (T+1, T−1), respectively. Here, the crosstalk sample value sequences CR1, CR2 are subtracted from the read sample value sequence R to produce the crosstalk removed read sample value sequence P which is free from the influence of the crosstalk from the adjacent tracks.

However, if the PLL circuit is out of synchronization to cause a synchronization error among the respective read sample value sequences SA–SC, the reference sample extracting circuit 130 no longer correctly extracts the reference sample. This causes the filter coefficient calculating circuit 123 and the variable coefficient filters 110–112 to perform malfunctions, resulting in the crosstalk removing circuit 40 failing to normally function. Particularly, once this malfunction occurs, even if the PLL circuit 10 recovers its synchronized state, it takes certain time for the filter coefficient calculating circuit 123 and the variable coefficient filters 110–112 to proceed to their normal operations, thus giving rise to a problem that these circuits cannot correctly reproduce data until the synchronized state is recovered.

OBJECTS AND SUMMARY OF THE INVENTION

The present invention has been made to solve the problem mentioned above, and its object is to provide a crosstalk removing device for use in a recorded information reproducing apparatus which is free from malfunctions even if read sample value sequences read from a recording medium and sampled suffer from synchronization error, and is capable of immediately proceeding to a crosstalk removing operation after the synchronization is recovered.

According to a first aspect, the present invention provides a crosstalk removing device for use in a recorded information reproducing apparatus which samples a read signal read from a recording track on a recording medium to produce a read sample value sequence, and removes from the read sample value sequence crosstalk from tracks adjacent to the recording track to produce a crosstalk removed read sample value sequence. The crosstalk removing device is characterized by comprising a filter coefficient calculating circuit for calculating filter coefficients which force an error value present in the crosstalk removed read sample value sequence to converge to zero, a variable coefficient filter for filtering the read sample value sequence based on the filter coefficients to produce crosstalk components from the adjacent tracks of the recording track, a subtractor for subtracting the crosstalk components from the read sample value sequence to output the difference as the crosstalk removed read sample value sequence, and means for providing predetermined fixed coefficient values as filter coefficients of the variable coefficient filter instead of the filter coefficients calculated by the filter coefficient calculating circuit during a time period in which the read sample value sequence remains in an asynchronous state.

According to a second aspect, the present invention provides a crosstalk removing device for use in a recorded information reproducing apparatus which samples a read signal read from a recording track on a recording medium to produce a read sample value sequence, and removes from the read sample value sequence crosstalk from tracks adjacent to the recording track to produce a crosstalk removed read sample value sequence. The crosstalk removing device is characterized by comprising a filter coefficient calculating circuit for calculating filter coefficients which force an error value present in the crosstalk removed read sample value sequence to converge to zero, an averaging circuit for calculating averages of the filter coefficients to derive average filter coefficients, a variable coefficient filter for filtering the read sample value sequence based on the filter coefficients to produce crosstalk components from the adjacent tracks of the recording track, a subtractor for subtracting the crosstalk components from the read sample value sequence to output the difference as the crosstalk removed read sample value sequence, and means for providing the average filter coefficients as filter coefficients of the variable coefficient filter instead of the filter coefficients calculated by the filter coefficient calculating circuit during a time period in which the read sample value sequence remains in an asynchronous state.

According to a third aspect, the present invention provides a crosstalk removing device for use in a recorded information reproducing apparatus which samples a read signal read from a recording track on a recording medium to produce a read sample value sequence, and removes from the read sample value sequence crosstalk from tracks adjacent to the recording track to produce a crosstalk removed read sample value sequence. The crosstalk removing device is characterized by comprising a filter coefficient calculating circuit for calculating filter coefficients which force an error value present in the crosstalk removed read sample value sequence to converge to zero, a variable coefficient filter for filtering the read sample value sequence based on the filter coefficients to produce crosstalk components from the adjacent tracks of the recording track, a subtractor for subtracting the crosstalk component from the read sample value sequence to output the difference as the crosstalk removed read sample value sequence, and means, operative when the read sample value sequence transitions from a synchronous state to an asynchronous state, for holding filter coefficients previously derived in the filter coefficient calculating circuit until immediately before the read sample value sequence transitions to the asynchronous state to provide the held filter coefficients as the filter coefficients of the variable coefficient filter.

BRIEF DESCRIPTION OF THE DRAWINGS

FIG. 13 is a block diagram illustrating an internal configuration of the filter coefficient calculating circuit 123' according to a further embodiment; and FIG. 14 is a block diagram illustrating an internal configuration of the filter coefficient calculating circuit 123' according to a further embodiment.

DETAILED DESCRIPTION OF THE PREFERRED EMBODIMENTS

The present invention will hereinafter be described in connection with several embodiments thereof with reference to the accompanying drawings.

Figure 5:
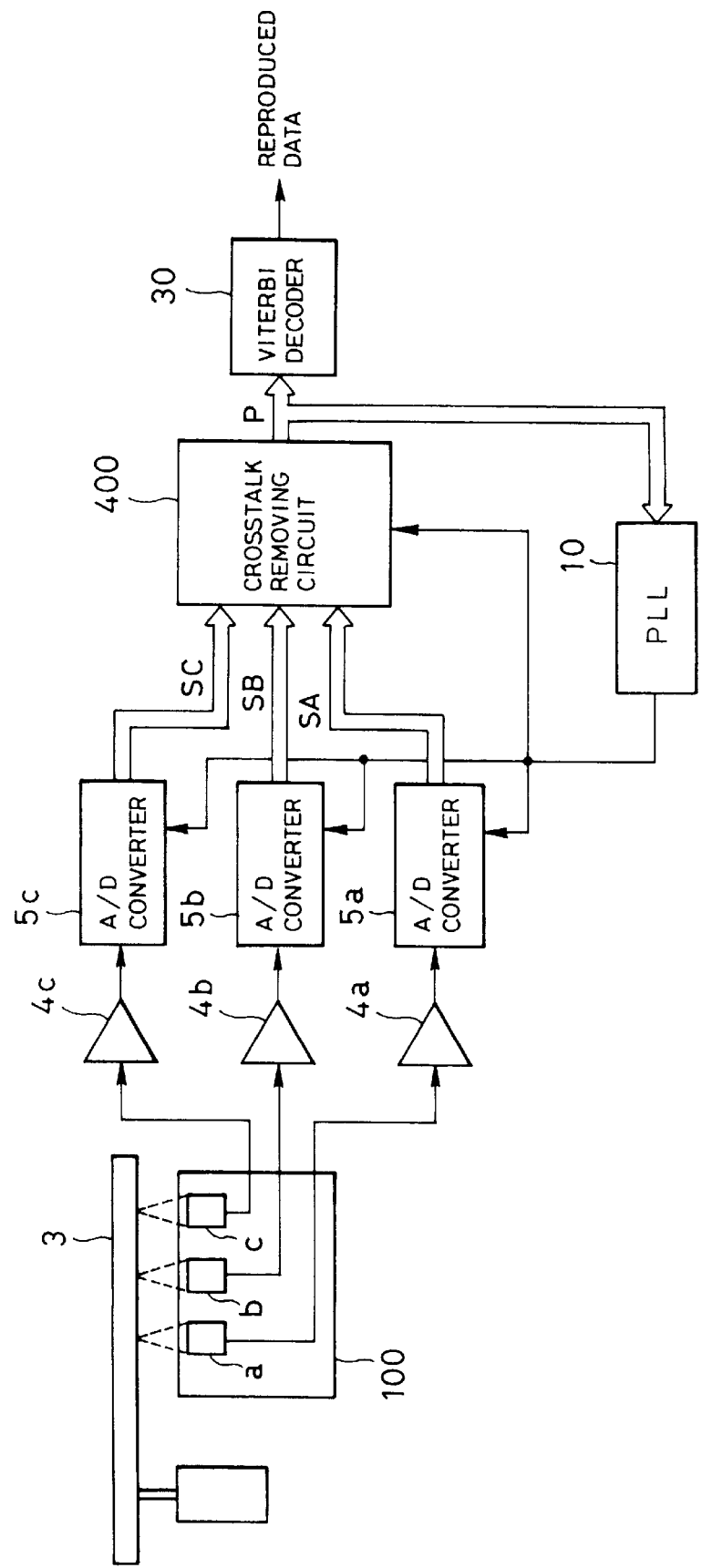
FIG. 5 is a block diagram illustrating the configuration of a recorded information reproducing apparatus which is provided with a crosstalk removing device according to the present invention.

FIG. 5 is a block diagram illustrating the configuration of a recorded information reproducing apparatus which is provided with a crosstalk removing device according to the present invention.

Referring specifically to FIG. 5, three reading elements "a"–"c" mounted in a pickup 100 simultaneously read recorded information read from corresponding ones of three mutually adjacent recording tracks, formed on a recording disc 3, to produce read signals which are supplied to head amplifiers 4a–4c, respectively. The head amplifiers 4a–4c amplify the read signals supplied from the reading elements "a"–"c", respectively, to respective desired levels, and supply the resultant amplified read signals to A/D converters 5a–5c, respectively. The A/D converters 5a–5c sequentially sample the respective amplified read signals at the timing of a clock signal supplied from a PLL circuit 10, and supply the resultant read sample value sequences SA–SC to a crosstalk removing circuit 400.

The crosstalk removing circuit 400 applies the read sample value sequences SA–SC with adaptive signal processing utilizing, for example, an LMS adaptive algorithm to remove crosstalk component from adjacent tracks from the read sample value sequence SB, thus producing a crosstalk removed read sample value sequence P.

The PLL circuit 10 detects a phase error present in the read signal based on the crosstalk removed read sample value sequence P, and supplies the A/D converters 5a–5c and the crosstalk removing circuit 400 with a clock signal having an oscillating frequency corresponding to the phase error.

A Viterbi decoder 30 produces the most likely binary reproduced data based on the crosstalk removed read sample value sequence P.

Figure 6:
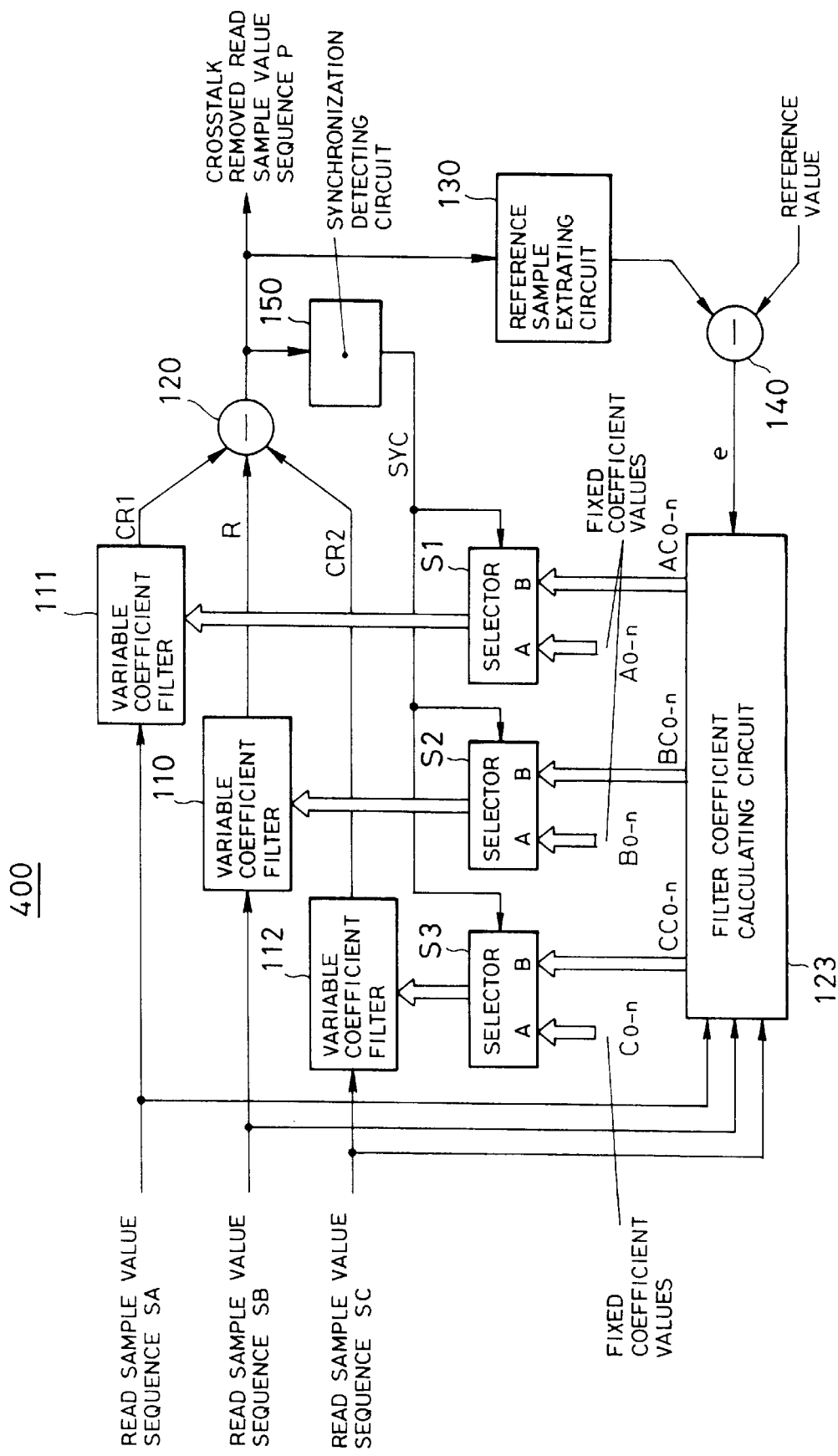
FIG. 6 is a block diagram illustrating an example of an internal configuration of a crosstalk removing circuit 400 according to the present invention.

FIG. 6 is a block diagram illustrating an example of an internal configuration of the crosstalk removing circuit 400 according to the present invention.

Figure 7:
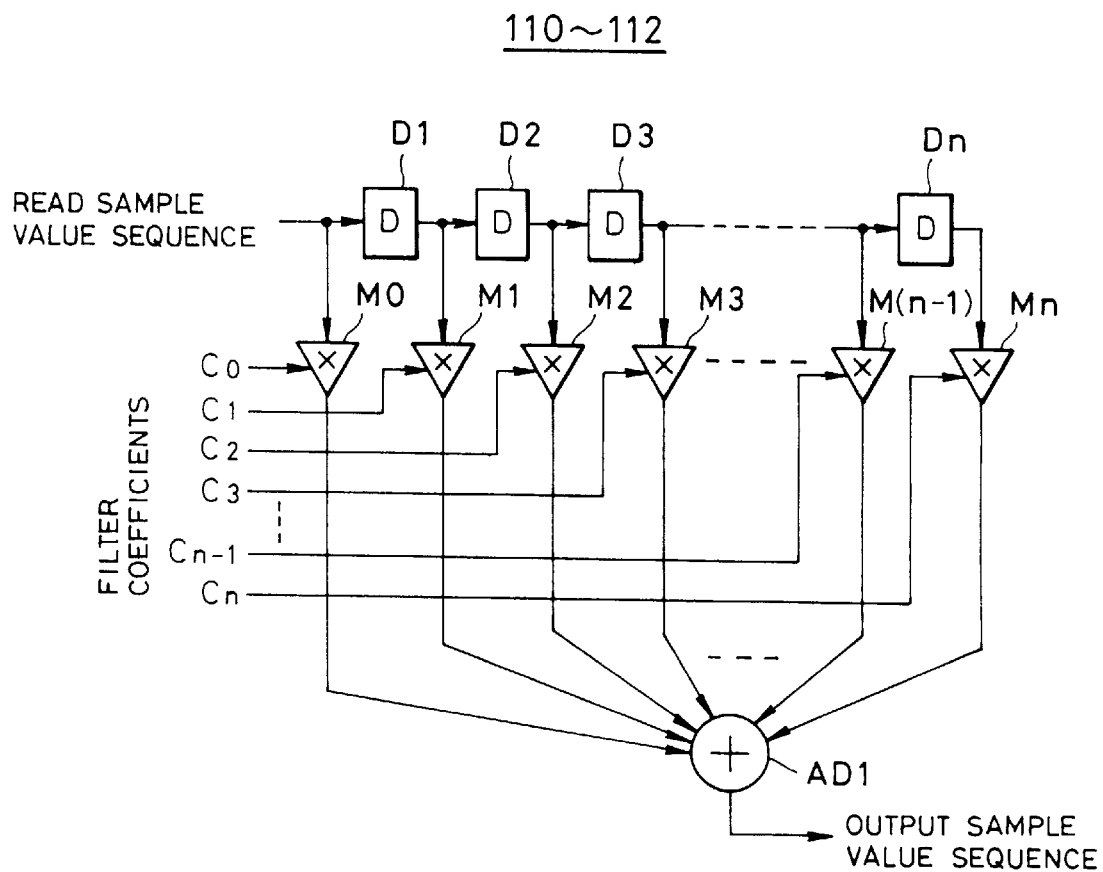
FIG. 7 is a block diagram illustrating an internal configuration of each of the variable coefficient filters 110–112.

Referring specifically to FIG. 6, each of variable coefficient filters 110, 111, 112 comprises a transversal filter as illustrated in FIG. 7.

The illustrated transversal filter consists of serially connected n-stage D flip-flops D1–Dn for sequentially shifting and fetching read sample value sequences (SA, SB, SC); a coefficient multiplier M0 for multiplying the read sample value sequences by a filter coefficient $C_0$; coefficient multipliers M1–Mn for multiplying respective outputs of the D flip-flops D1–Dn by filter coefficients $C_1$–$C_n$, respectively; and an adder AD1 for adding the respective products from the coefficient multipliers M0–Mn and outputting the sum.

The variable coefficient filter 110 filters the read sample value sequence SB based on filter coefficients supplied from a selector S2, later described, to produce a read sample value sequence R having inter-symbol interference removed therefrom, and supplies this read sample value sequence R to a subtractor 120. The variable coefficient filter 111 filters the read sample value sequence SA based on filter coefficients supplied from a selector S1, later described, to produce a crosstalk sample value sequence CR1 corresponding to a crosstalk component from an adjacent track, and supplies this crosstalk sample value sequence CR1 to the subtractor 120. The variable coefficient filter 112 filters the read sample value sequence SC based on filter coefficients supplied from a selector S3, later described, to produce a crosstalk sample value sequence CR2 corresponding to a crosstalk component from the other adjacent track, and supplies this crosstalk sample value sequence CR2 to the subtractor 120.

The subtractor 120 subtracts the crosstalk sample value sequences CR1, CR2 from the read sample value sequence R to produce the crosstalk removed read sample value sequence P. The subtractor 120 supplies the crosstalk removed read sample value sequence P to each of the Viterbi decoder 30 and the PLL circuit 10 illustrated in FIG. 5, as well as to each of a reference sample extracting circuit 130 and a synchronization detecting circuit 150.

The reference sample extracting circuit 130 extract a predetermined sample value from the crosstalk removed read sample value sequence P sequentially supplied thereto from the subtractor 120, and supplies the predetermined sample value to a subtractor 140. For example, when the values of three successive sample sequences within the crosstalk removed read sample value sequence P transit from positive to negative or from negative to positive, the reference sample extracting circuit 130 extracts the central sample value of the three successive sample values, i.e., a sample value at zero-cross time, and supplies the extracted sample value to the subtractor 140. The subtractor 140 calculates the difference between the sample value extracted by the reference sample extracting circuit 130 and a predetermined reference value, and supplies the filter coefficient calculating circuit 123 with the difference as an error value "e".

Figure 8:
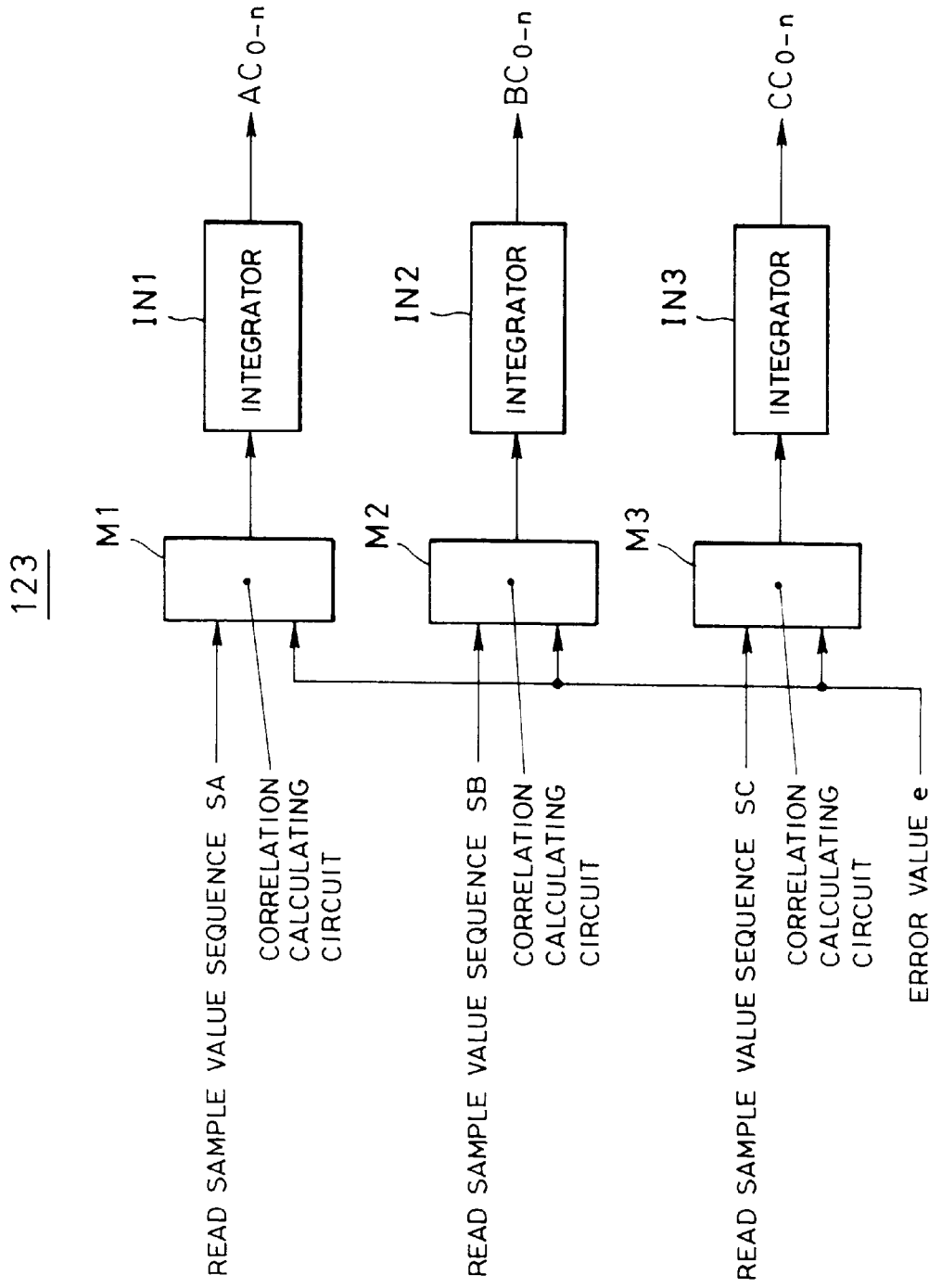
FIG. 8 is a block diagram illustrating an example of an internal configuration of a filter coefficient calculating circuit 123.

FIG. 8 is a block diagram illustrating an example of an internal configuration of the filter coefficient calculating circuit 123.

Referring specifically to FIG. 8, a correlation calculating circuit M1 multiplies each of read sample values for successive (n+1) samples in the read sample value sequence SA by the error value "e" to derive the correlation of each read sample to the error value "e", and supplies the thus derived correlation values to an integrator IN1. A correlation calculating circuit M2 multiplies each of read sample values for successive (n+1) samples in the read sample value sequence SB by the error value "e" to derive the correlation of each read sample to the error value "e", and supplies the thus derived correlation values to an integrator IN2. A correlation calculating circuit M3 multiplies each of read sample values for successive (n+1) samples in the read sample value sequence SC by the error value "e" to derive the correlation of each read sample to the error value "e", and supplies the thus derived correlation values to an integrator IN3.

Figure 9:
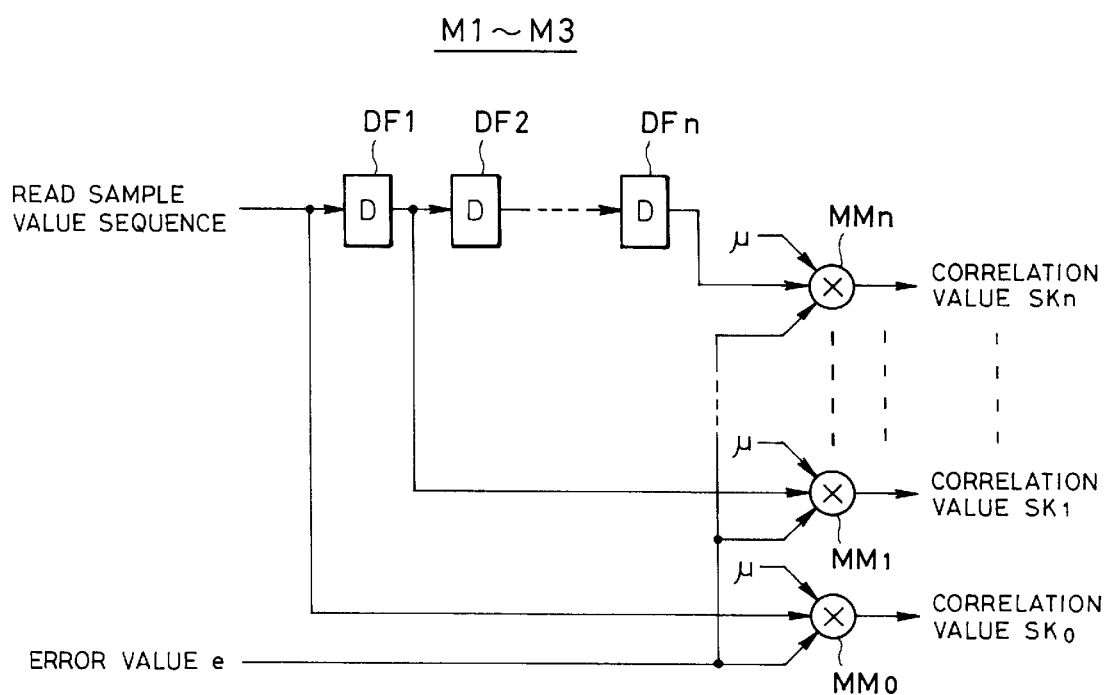
FIG. 9 is a block diagram illustrating an example of an internal configuration of each of correlation calculating circuits M1–M3.

It should be noted that the correlation calculating circuits M1–M3 have the same configuration, an example of which is illustrated in FIG. 9.

Referring specifically to FIG. 9, each of the correlation calculating circuits M1–M3 consists of serially connected n-stage D flip-flops DF1–DFn for sequentially shifting and fetching a read sample value sequence supplied thereto; and multipliers MM0–MMn. The multiplier MM0 multiplies a read sample value sequence supplied thereto by the error value "e" and a modification coefficient $\mu$ and outputs this product as a correlation value $SK_0$. Likewise, the multipliers MM1–MMn multiply outputs of the corresponding D flip-flops DF1–DFn by the error value "e" and the modification coefficient $\mu$ and output the products as correlation values $SK_1$–$SK_n$.

The modification coefficient $\mu$ is a coefficient for adjusting the convergency of the LMS adaptive algorithm. For example, as the modification coefficient $\mu$ is larger, a converging rate can be increased when the error value "e" is brought to zero, however, divergence is likely to occur. Conversely, as the modification coefficient $\mu$ is smaller, the converging rate is lower although the convergence is ensured.

The integrator IN1 integrates each of the correlation values $SK_0$–$SK_n$ supplied thereto from the correlation calculating circuit M1 for each correlation value corresponding to its order number, and outputs respective integration results as filter coefficients $AC_0$–$AC_n$. The integrator IN2 integrates each of the correlation values $SK_0$–$SK_n$ supplied thereto from the correlation calculating circuit M2 for each correlation value corresponding to its order number, and outputs respective integration results as filter coefficients $BC_0$–$BC_n$. The integrator IN3 integrates each of the correlation values $SK_0$–$SK_n$ supplied thereto from the correlation calculating circuit M3 for each correlation value corresponding to its order number, and outputs respective integration results as filter coefficients $CC_0$–$CC_n$. The filter coefficient calculating circuit 123 supplies the filter coefficients $AC_0$–$AC_n$ to an input terminal B of the selector S1 illustrated in FIG. 6; the filter coefficients $BC_0$–$BC_n$ to an input terminal B of the selector S2; and the filter coefficients $CC_0$–$CC_n$ to an input terminal B of the selector S3, respectively. In addition, the selectors S1–S3 are fixedly supplied at their respective input terminals A with predetermined fixed coefficient values $A_0$–$A_n$, $B_0$–$B_n$, $C_0$–$C_n$, respectively.

With the configuration as described above, the filter coefficient calculating circuit 123 repetitively updates each of the filter coefficients $A_0$–$A_n$, $B_0$–$B_n$, $C_0$–$C_n$ based on the LMS (least mean square) adaptive algorithm such that the error value "e" converges to zero.

The synchronization detecting circuit 150 in FIG. 6 generates a synchronization detecting signal SYC at logical level "1" when a synchronization signal is being detected at predetermined intervals from the crosstalk removed read sample value sequence P supplied from the subtractor 120, and at logical level "0" when the synchronization signal is no longer detected, and supplies the synchronization detecting signal SYC to a selection control terminal of each of the selectors S1–S3.

The selector S1 supplies the variable coefficient filter 111 with the filter coefficients $AC_0$–$AC_n$ supplied thereto at an input terminal B as the filter coefficients $C_0$–$AC_n$ of the variable coefficient filter 111, when the synchronization detecting signal SYC is at logical level "1," i.e., when the synchronization signal is being detected at predetermined intervals from the crosstalk removed read sample value sequence P. On the other hand, the selector S1 supplies the variable coefficient filter 111 with the fixed coefficient values $A_0$–$A_n$ supplied thereto at an input terminal A as the filter coefficients $C_0$–$C_n$ of the variable coefficient filter 111, when the synchronization detecting signal SYC is at logical level "0," i.e., when the synchronization signal is no longer detected from the crosstalk removed read sample value sequence P.

The selector S2 supplies the variable coefficient filter 110 with the filter coefficients $BC_0$–$BC_n$ supplied thereto at an input terminal B as the filter coefficients $C_0$–$C_n$ of the variable coefficient filter 110, when the synchronization detecting signal SYC is at logical level "1," i.e., when the synchronization signal is being detected at predetermined intervals from the crosstalk removed read sample value sequence P. On the other hand, the selector S2 supplies the variable coefficient filter 110 with the fixed coefficient values $B_0$–$B_n$ supplied thereto at an input terminal A as the filter coefficients $C_0$–$C_n$ of the variable coefficient filter 110, when the synchronization detecting signal SYC is at logical level "0," i.e., when the synchronization signal is no longer detected from the crosstalk removed read sample value sequence P.

The selector S3 supplies the variable coefficient filter 112 with the filter coefficients $CC_0$–$CC_n$ supplied thereto at an input terminal B as the filter coefficients $C_0$–$C_n$ of the variable coefficient filter 112, when the synchronization detecting signal SYC is at logical level "1," i.e., when the synchronization signal is being detected at predetermined intervals from the crosstalk removed read sample value sequence P. On the other hand, the selector S3 supplies the variable coefficient filter 112 with the fixed coefficient values $C_0$–$C_n$ supplied thereto at an input terminal A as the filter coefficients $C_0$–$C_n$ of the variable coefficient filter 112, when the synchronization detecting signal SYC is at logical level "0," i.e., when the synchronization signal is no longer detected from the crosstalk removed read sample value sequence P.

Figure 1:
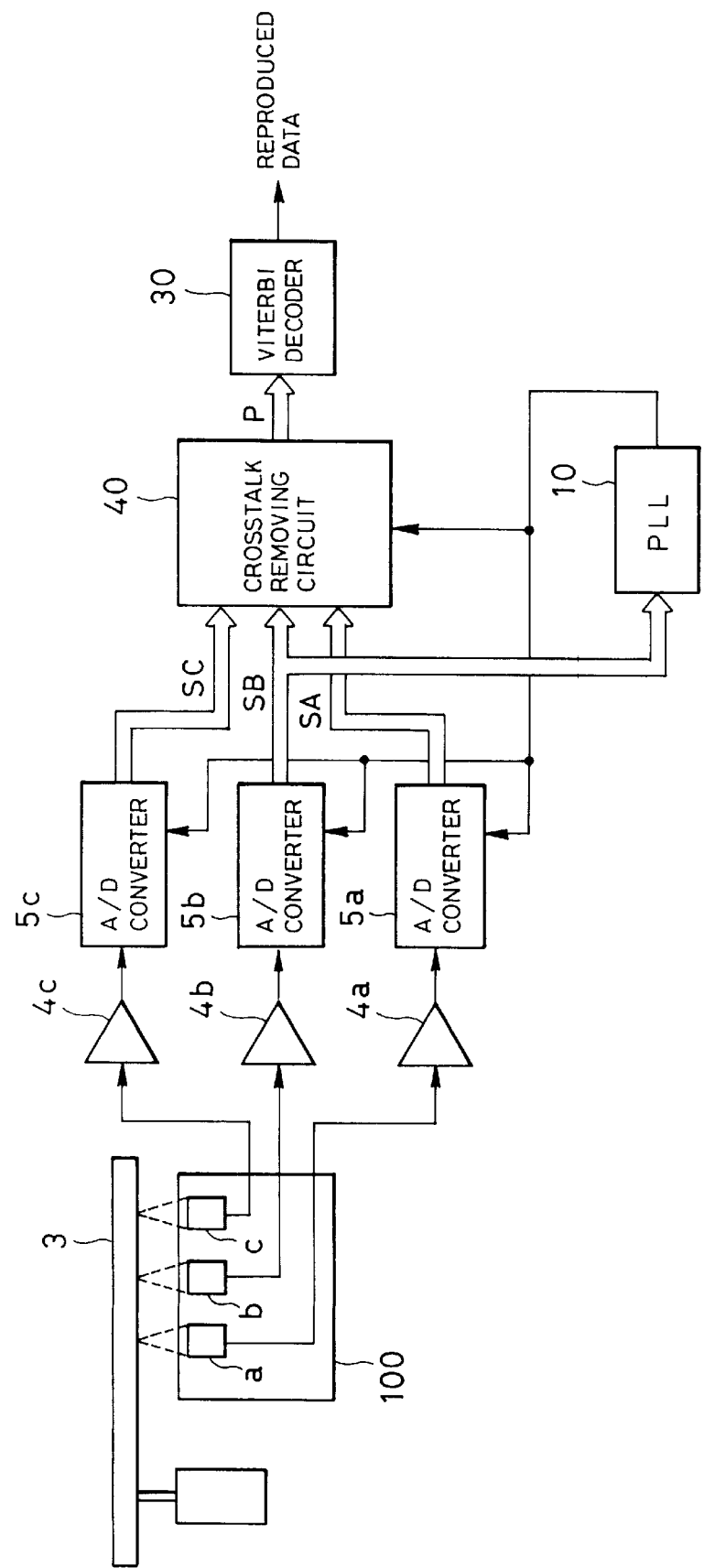
FIG. 1 is a block diagram illustrating an exemplary configuration of a conventional recorded information reproducing apparatus.
Figure 2:
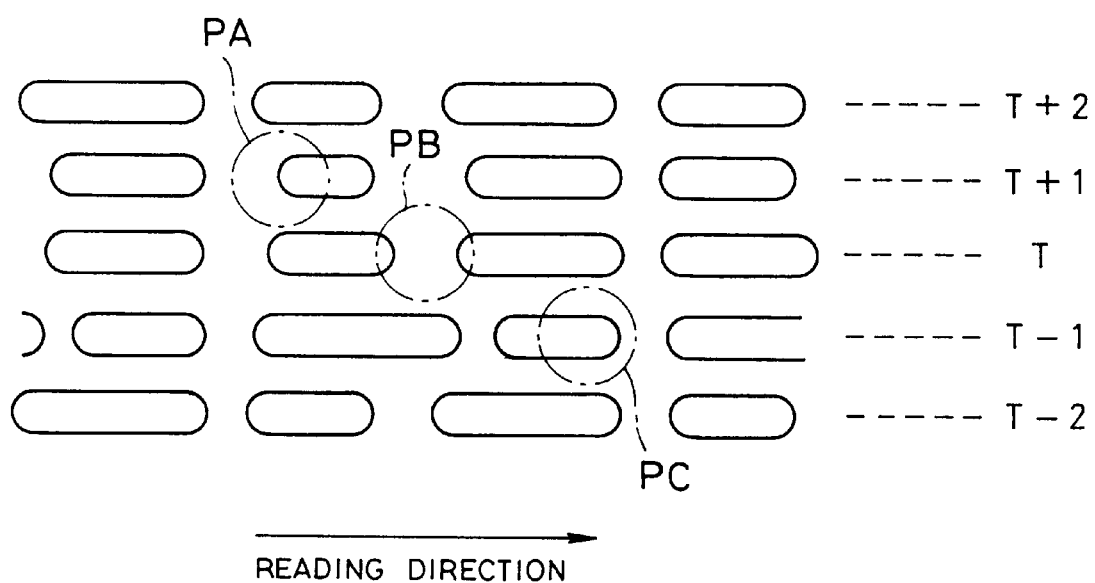
FIG. 2 is a diagram illustrating a positional relationship between beam spots PA–PC irradiated from respective reading elements "a"–"c" and respective recording tracks on a recording disc 3.
Figure 3:
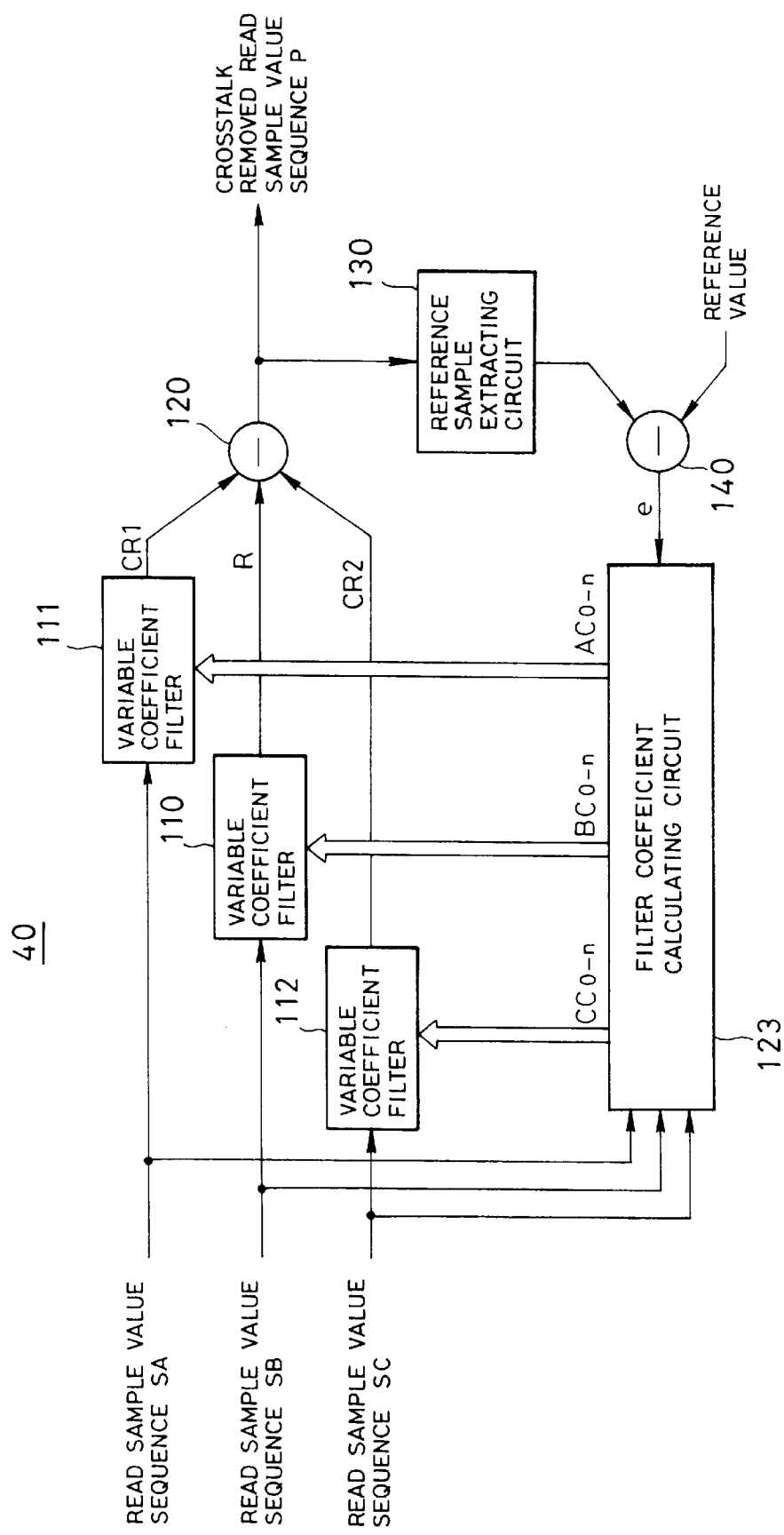
FIG. 3 is a block diagram illustrating an internal configuration of a conventional crosstalk removing circuit 40.
Figure 4:
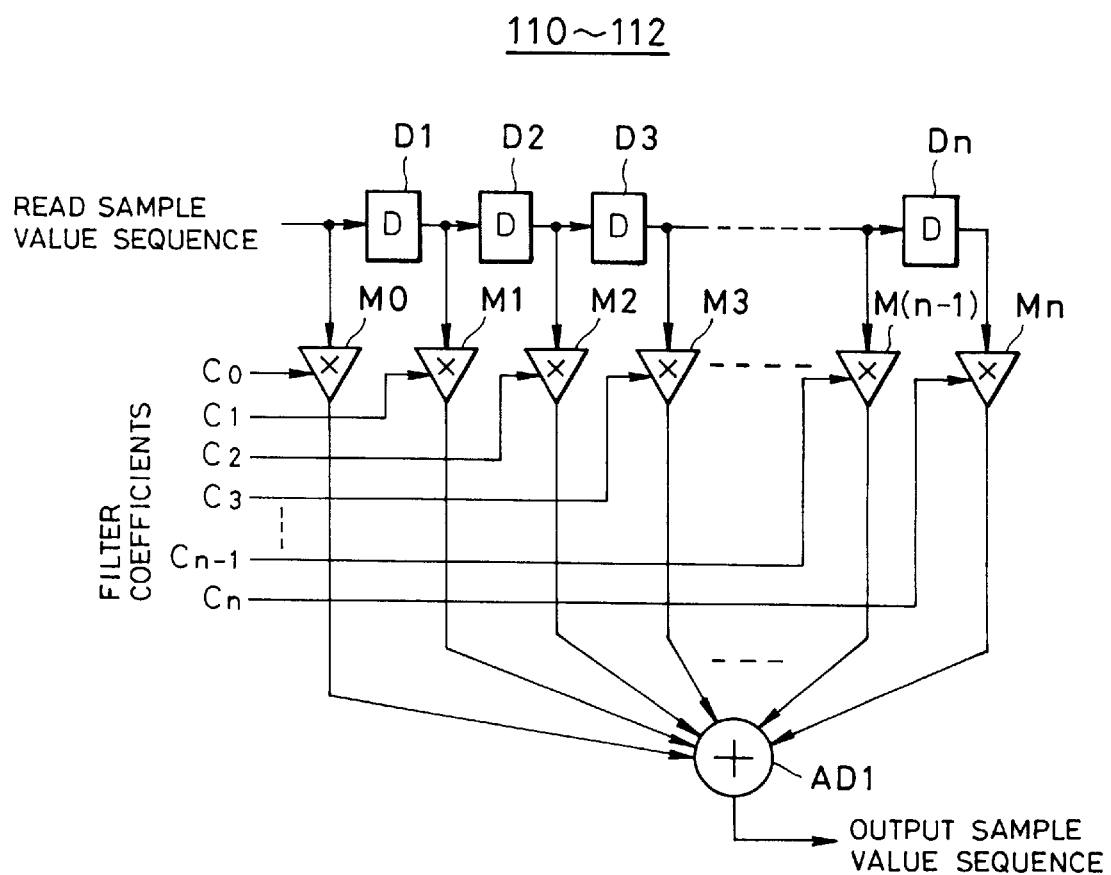
FIG. 4 is a block diagram illustrating an internal configuration of each of variable coefficient filters 110–112.

As described above, in the crosstalk removing circuit 400 illustrated in FIG. 6, when the synchronization signal is being detected from the read sample value sequence read from the recording disc 3, the filter coefficients of the variable coefficient filter are sequentially updated with filter coefficients calculated by the filter coefficient calculating circuit 123, in a manner similar to the conventional crosstalk removing circuit 40 as illustrated in FIG. 3. However, when the synchronization signal is no longer detected from the read sample value sequence, predetermined fixed coefficient values are fixedly supplied as the coefficient values of the variable coefficient filter instead of the filter coefficients calculated in the filter coefficient calculating circuit 123.

According to the configuration as described above, even if a read sample value sequence experiences a synchronization error and remains in an asynchronous state, the updating operation based on the erroneous read sample value coefficients is inhibited, thus preventing the filter coefficient calculating circuit 123 and the variable coefficient filters 110–112 from malfunctioning.

It should be noted that each of the integrators IN1–IN3 in the filter coefficient calculating circuit 123 as illustrated in FIG. 8 may be implemented, for example, by an integrator composed of an adder and a D flip-flop.

Figure 10:
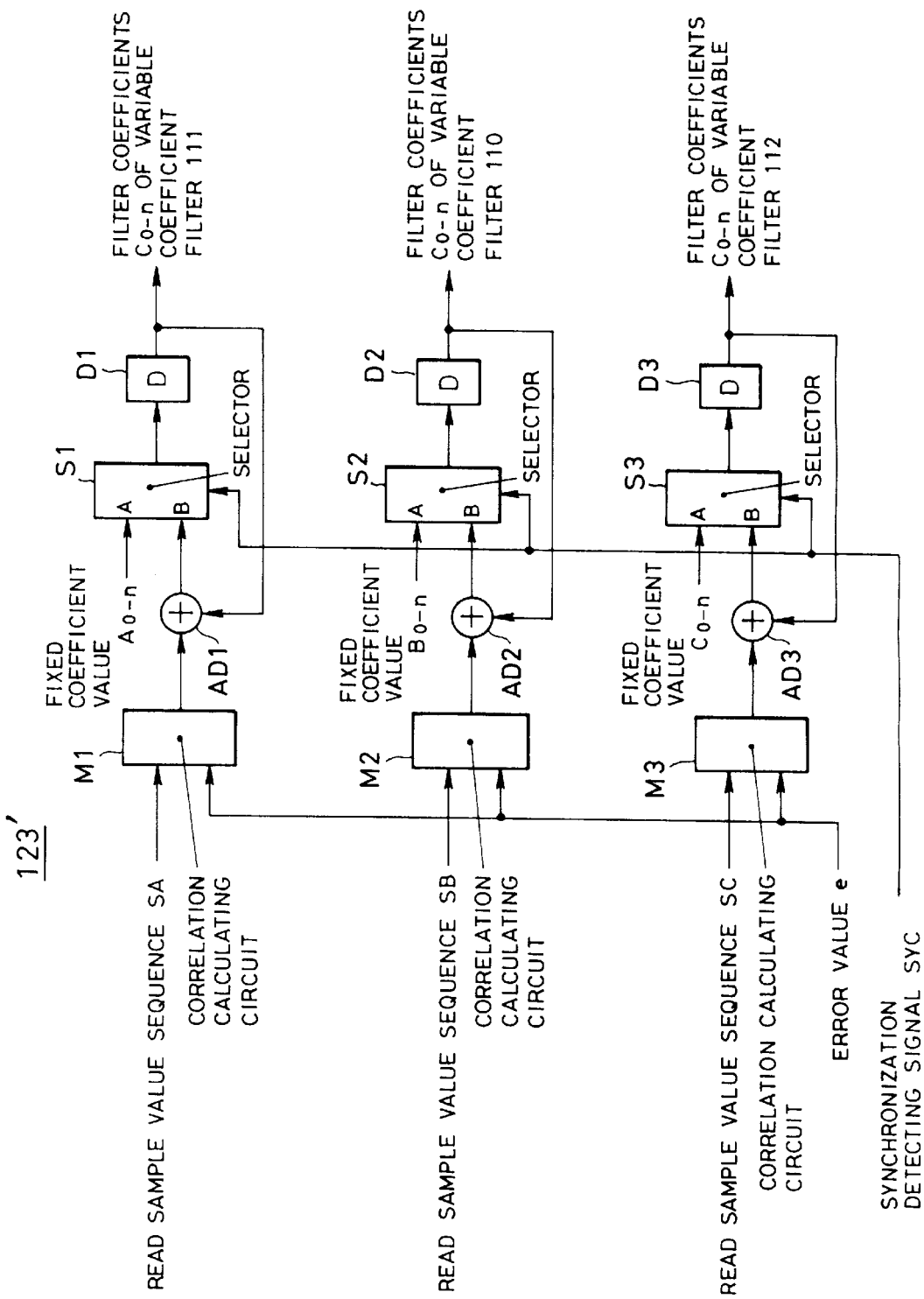
FIG. 10 is a block diagram illustrating an example of an internal configuration of a filter coefficient calculating circuit 123'.

In this case, a filter coefficient calculating circuit 123' as illustrated in FIG. 10 may be employed instead of the filter coefficient calculating circuit 123 and the selectors S1–S3 illustrated in FIG. 6. Specifically, the filter coefficient calculating circuit 123 includes the selectors S1–S3 in the filter coefficient calculating circuit 123 illustrated in FIG. 8.

Each of the correlation calculating circuits M1–M3 illustrated in FIG. 10 has the same functions as that illustrated in the aforementioned FIG. 8, and supplies correlation values $SK_0$–$SK_n$ calculated by respective correlation calculations to the respective adders AD1–AD3.

The adder AD1 and the D flip-flop D1 form an integrator which integrates the correlation values $SK_0$–$SK_n$ supplied thereto from the correlation calculating circuit M1 for each of its order numbers, and outputs the integration results of the respective correlation values $SK_0$–$SK_n$ as the filter coefficients $C_0$–$C_n$ of the variable coefficient filter 111. A selector S1 is disposed between the adder AD1 and the D flip-flop D1. The selector S1 supplies an addition output of the adder AD1 to the D flip-flop D1 when the synchronization detecting signal SYC is at logical level "1," i.e., when the synchronization signal is detected at predetermined intervals from the crosstalk removed read sample value sequence P. On the other hand, the selector S1 supplies predetermined fixed coefficient values $A_0$–$A_n$ to the D flip-flop D1 when the synchronization detecting signal SYC is at logical level "0," i.e., when the synchronization signal is no longer detected from the crosstalk removed read sample value sequence P. The adder AD2 and the D flip-flop D2 form an integrator which integrates the correlation values $SK_0$–$SK_n$ supplied thereto from the correlation calculating circuit M2 for each of its order numbers, and outputs the integration results of the respective correlation values $SK_0$–$SK_n$ as the filter coefficients $C_0$–$C_n$ of the variable coefficient filter 110. A selector S2 is disposed between the adder AD2 and the D flip-flop D2. The selector S2 supplies an addition output of the adder AD2 to the D flip-flop D2 when the synchronization detecting signal SYC is at logical level "1," i.e., when the synchronization signal is detected at predetermined intervals from the crosstalk removed read sample value sequence P. On the other hand, the selector S2 supplies predetermined fixed coefficient values $B_0$–$B_n$ to the D flip-flop D2 when the synchronization detecting signal SYC is at logical level "0," i.e., when the synchronization signal is no longer detected from the crosstalk removed read sample value sequence P. The adder AD3 and the D flip-flop D3 form an integrator which integrates the correlation values $SK_0$–$SK_n$ supplied thereto from the correlation calculating circuit M3 for each of its order numbers, and outputs the integration results of the respective correlation values $SK_0$–$SK_n$ as the filter coefficients $C_0$–$C_n$ of the variable coefficient filter 112. A selector S3 is disposed between the adder AD3 and the D flip-flop D3. The selector S3 supplies an addition output of the adder AD3 to the D flip-flop D3 when the synchronization detecting signal SYC is at logical level "1," i.e., when the synchronization signal is detected at predetermined intervals from the crosstalk removed read sample value sequence P.

On the other hand, the selector S3 supplies predetermined fixed coefficient values $C_0$–$C_n$ to the D flip-flop D3 when the synchronization detecting signal SYC is at logical level "0," i.e., when the synchronization signal is no longer detected from the crosstalk removed read sample value sequence P.

According to the configuration illustrated in FIG. 10, during a time period in which a read sample value sequence read from the recording disc 3 experiences a synchronization error and remains in an asynchronous state, the fixed coefficient values $A_0$–$A_n$, $B_0$–$B_n$, $C_0$–$C_n$ are used as they are for the filter coefficients $C_0$–$C_n$ of the variable coefficient filters 111, 110, 112, respectively. In this event, since an integrating operation by the integrator formed of the adder AD1 (AD2, AD3) and the D flip-flop D1 (D2, D3) is stopped until the synchronization is restored, it is possible to prevent the integration output from diverging during the asynchronous period.

While the embodiment illustrated in FIG. 6 is configured such that the variable coefficient filters 110–112 are fixedly supplied with the predetermined fixed coefficient values $A_0$–$A_n$, $B_0$–$B_n$, $C_0$–$C_n$, respectively, as their respective filter coefficients during the asynchronous period as mentioned above, the present invention is not limited to this particular configuration.

For example, during a period of an asynchronous state as mentioned above, average values of filter coefficients so far calculated by the filter coefficient calculating circuit 123 until immediately before a synchronous state transitions to an asynchronous state may be used as filter coefficients of the respective variable coefficient filters 110–112.

Figure 11:
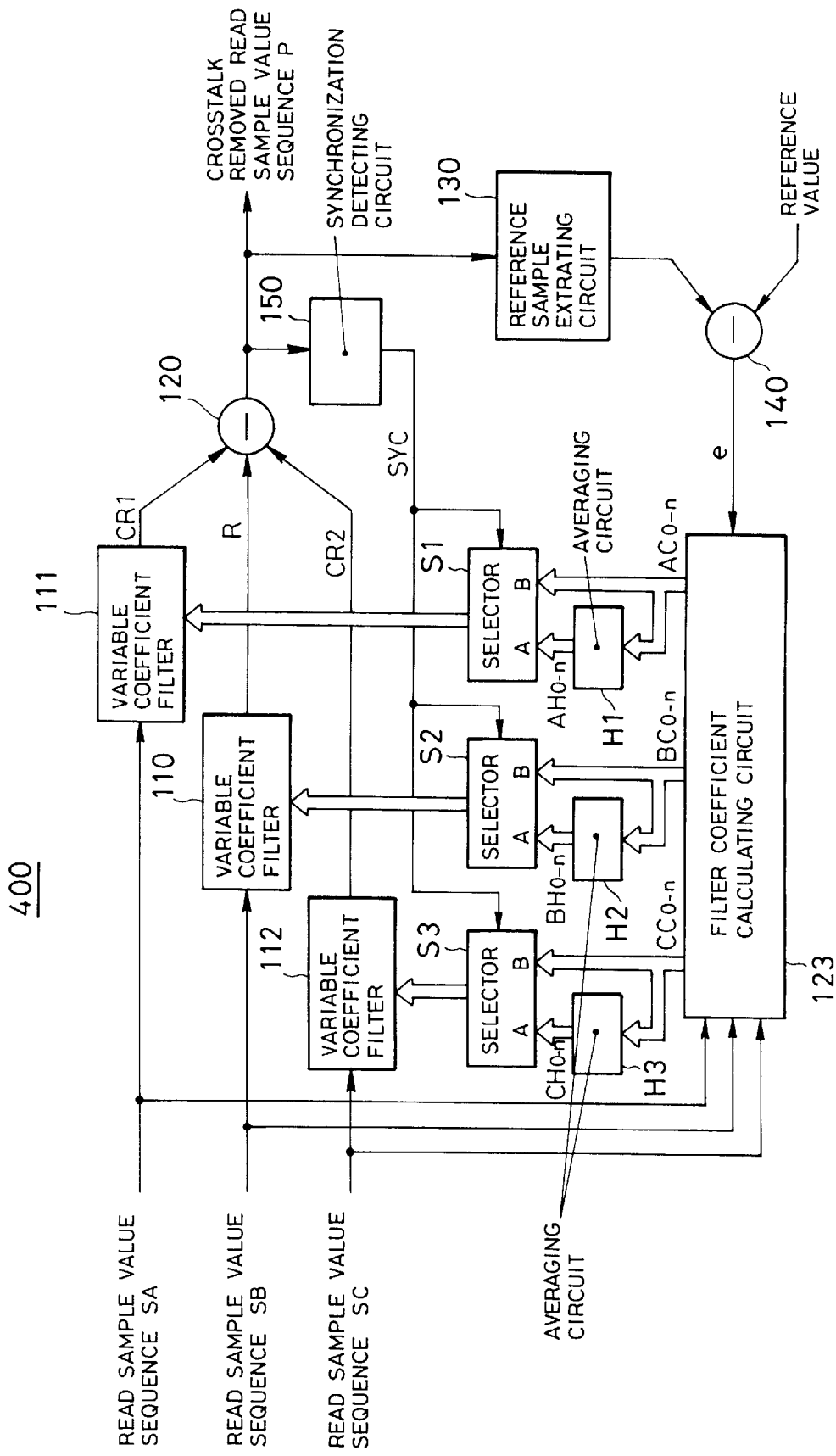
FIG. 11 is a block diagram illustrating another configuration of the crosstalk removing circuit 400 according to the present invention.

FIG. 11 illustrates an example of another configuration of the crosstalk removing circuit 400 which has been made in view of the modification just mentioned above.

In the configuration illustrated in FIG. 11, components other than averaging circuits H1–H3 are identical to those illustrated in FIG. 6, so that explanation thereon is omitted.

Referring specifically to FIG. 11, the averaging circuit H1 calculates an average value of each of filter coefficients $AC_0$–$AC_n$ supplied thereto from the filter coefficient calculating circuit 123, and supplies the respective average values to the input terminal A of the selector S1 as average filter coefficients $AH_0$–$AH_n$. The selector S1 supplies the aforementioned filter coefficients $AC_0$–$AC_n$ to the variable coefficient filter 111 as the filter coefficients $C_0$–$C_n$ of the variable coefficient filter 111 when the synchronization detecting signal SYC supplied from the synchronization detecting circuit 150 is at logical level "1." On the other hand, the selector S1 supplies the respective average filter coefficients $AH_0$–$AH_n$ to the variable coefficient filter 111 as the filter coefficients $C_0$–$C_n$ of the variable coefficient filter 111 when the synchronization detecting signal SYC is at logical level "0," i.e., when the synchronization signal is no longer detected from the crosstalk removed read sample value sequence P. The averaging circuit H2 calculates an average value of each of filter coefficients $BC_0$–$BC_n$ supplied thereto from the filter coefficient calculating circuit 123, and supplies the respective average values to the input terminal A of the selector S2 as average filter coefficients $BH_0$–$BH_n$. The selector S2 supplies the aforementioned filter coefficients $BC_0$–$BC_n$ to the variable coefficient filter 110 as the filter coefficients $C_0$–$C_n$ of the variable coefficient filter 110 when the synchronization detecting signal SYC is at logical level "1." On the other hand, the selector S2 supplies the respective average filter coefficients $BH_0$–$BH_n$ to the variable coefficient filter 110 as the filter coefficients $C_0$–$C_n$ of the variable coefficient filter 111 when the synchronization detecting signal SYC is at logical level "0," i.e., when the synchronization signal is no longer detected from the crosstalk removed read sample value sequence P. The averaging circuit H3 calculates an average value of each of filter coefficients $CC_0$–$CC_n$ supplied thereto from the filter coefficient calculating circuit 123, and supplies the respective average values to the input terminal A of the selector S3 as average filter coefficients $CH_0$–$CH_n$. The selector S3 supplies the aforementioned filter coefficients $CC_0$–$CC_n$ to the variable coefficient filter 112 as the filter coefficients $C_0$–$C_n$ of the variable coefficient filter 112 when the synchronization detecting signal SYC is at logical level "1." On the other hand, the selector S3 supplies the respective average filter coefficients $CH_0$–$CH_n$ to the variable coefficient filter 112 as the filter coefficients $C_0$–$C_n$ of the variable coefficient filter 112 when the synchronization detecting signal SYC is at logical level "0," i.e., when the synchronization signal is no longer detected from the crosstalk removed read sample value sequence P.

Alternatively, the averaging circuits H1–H3 and the selectors S1–S3 illustrated in FIG. 11 may be included in the filter coefficient calculating circuit 123.

Figure 12:
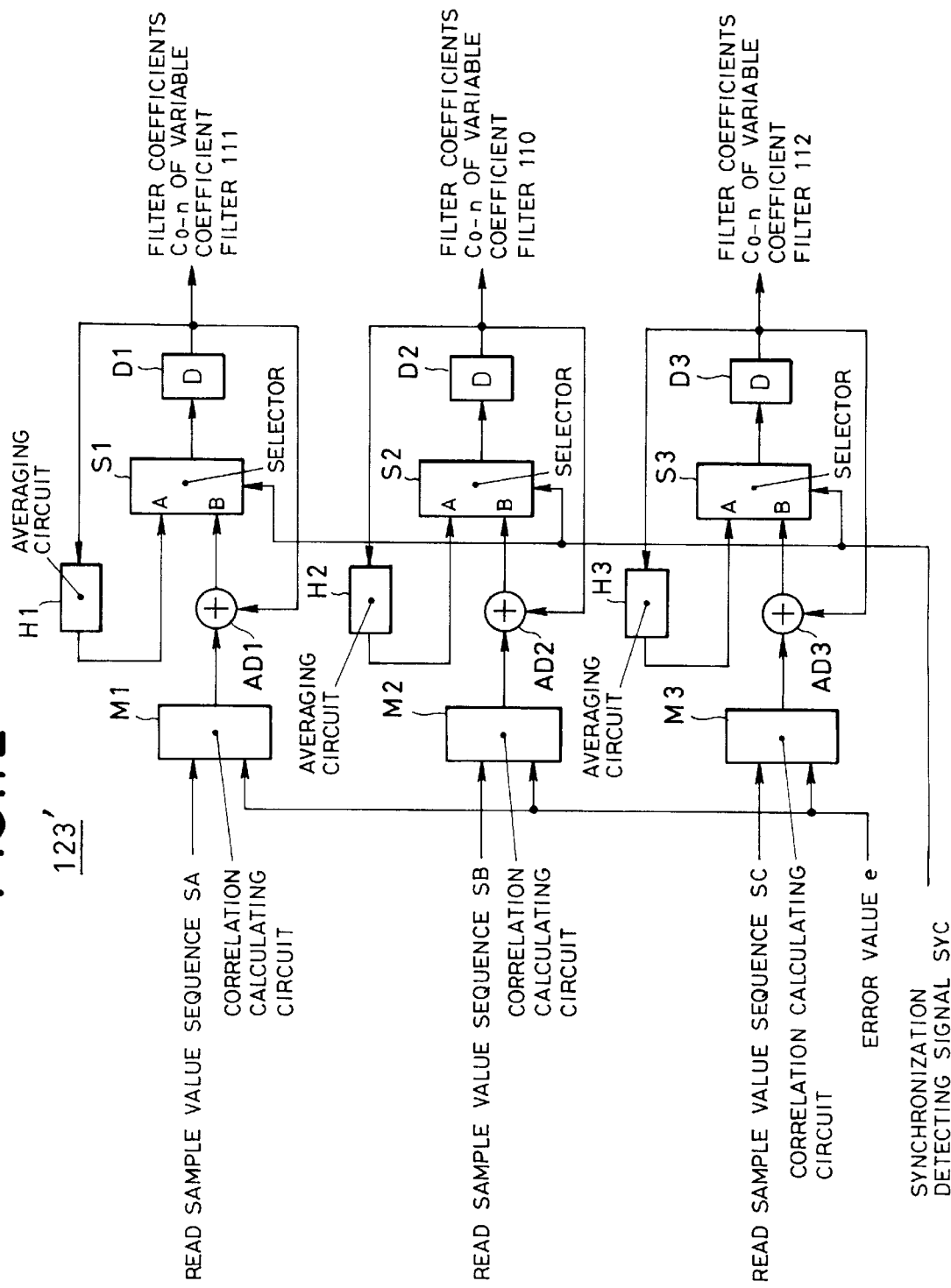
FIG. 12 is a block diagram illustrating an internal configuration of the filter coefficient calculating circuit 123' according to another embodiment.

FIG. 12 illustrates a block diagram illustrating an alternative example of a filter calculating circuit 123' which is configured by incorporating the averaging circuits H1–H3 and the selectors S1–S3 illustrated in FIG. 11 in the filter calculating circuit 123 illustrated in FIG. 8.

Specifically, in the filter coefficient calculating circuit 123' illustrated in FIG. 12, the configuration illustrated in FIG. 10 is provided with averaging circuits H1–H3 which calculate average values of filter coefficients outputted from the respective D flip-flops D1–D3 and supply the average values to the respective input terminals A of the selectors S1–S3.

According to this configuration, it is possible to prevent an integrator formed of an adder AD1 (AD2, AD3) and a D flip-flop D1 (D2, D3) from diverging in its integrating operation during an asynchronous period, as is the case of the configuration previously illustrated in FIG. 10.

Alternatively, filter coefficients so far calculated until immediately before the occurrence of synchronization error may be held and supplied during an asynchronous period, instead of the foregoing embodiments in which predetermined fixed coefficients or average filter coefficients are supplied as the filter coefficients of the variable coefficient filter.

FIG. 13 is a block diagram illustrating an alternative embodiment of the filter coefficient calculating circuit 123' which has been made in view of the modification just mentioned above.

Correlation calculating circuits M1–M3 and integrators IN1–IN3 illustrated in FIG. 13 have the same functions as their counterparts illustrated in the aforementioned FIG. 8. The respective correlation calculating circuits M1–M3 supply correlation values $SK_0$–$SK_n$ derived by their respective correlation calculations to switches SW1–SW3, respectively.

The switch SW1 is turned on when the synchronization detecting signal SYC is at logical level "1," i.e., when the synchronization signal is being detected at predetermined intervals from the crosstalk removed read sample value sequence P, and supplies the integrator IN1 with the correlation values $SK_0$–$SK_n$ supplied from the correlation calculating circuit M1. On the other hand, when the synchronization detecting signal SYC is at logical level "0," i.e., when the synchronization signal is no longer detected from the crosstalk removed read sample value sequence P, the switch SW1 is turned off. In this event, therefore, the integrator IN1 is not supplied with any signal inputs, so that output values at a current time are held. Stated another way, the values of filter coefficients output from the integrator IN1 until immediately before a synchronization error occurs are held in the integrator IN1, and the held filter coefficient values are supplied to the variable coefficient filter 111 during the synchronization error period.

The switch SW2 is turned on when the synchronization detecting signal SYC is at logical level "1," i.e., when the synchronization signal is being detected at predetermined intervals from the crosstalk removed read sample value sequence P, and supplies the integrator IN2 with the correlation values $SK_0$–$SK_n$ supplied from the correlation calculating circuit M2. On the other hand, when the synchronization detecting signal SYC is at logical level "0," i.e., when the synchronization signal is no longer detected from the crosstalk removed read sample value sequence P, the switch SW2 is turned off. In this event, therefore, the integrator IN2 is not supplied with any signal inputs, so that output values at a current time are held. Stated another way, the values of filter coefficients output from the integrator IN2 until immediately before a synchronization error occurs are held in the integrator IN2, and the held filter coefficient values are supplied to the variable coefficient filter 110 during the synchronization error period.

The switch SW3 is turned on when the synchronization detecting signal SYC is at logical level "1," i.e., when the synchronization signal is being detected at predetermined intervals from the crosstalk removed read sample value sequence P, and supplies the integrator IN3 with the correlation values $SK_0$–$SK_n$ supplied from the correlation calculating circuit M3. On the other h and, when the synchronization detecting signal SYC is at logical level "0," i.e., when the synchronization signal is no longer detected from the crosstalk removed read sample value sequence P, the switch SW3 is turned off. In this event, therefore, the integrator IN3 is not supplied with any signal inputs, so that output values at a current time are held. Stated another way, the values of filter coefficients output from the integrator IN3 until immediately before a synchronization error occurs are held in the integrator IN3, and the held filter coefficient values are supplied to the variable coefficient filter 112 during the synchronization error period.

The switch SW1 (SW2, SW3) and the integrator IN1 (IN2, IN3) illustrated in FIG. 13 may be implemented by an accumulator formed of an adder AD1 (AD2, AD3) and an enable D flip-flop ED1 (ED2, ED3), as illustrated in FIG. 14.

Each of the enable D flip-flops ED1–ED3 illustrated in FIG. 14 performs a normal operation as a D flip-flop when the synchronization detecting signal SYC is at logical level "1," i.e., when the synchronization signal is being detected at predetermined intervals from the crosstalk removed read sample value sequence P. Specifically, in this event, each time correlation values $SK_0$–$SK_n$ are supplied from the correlation calculating circuit M1 (M2, M3), the accumulator formed of the adder AD1 (AD2, AD3) and the enable D flip-flop ED1 (ED2, ED3) accumulates the correlation values for each order number. The results of accumulating the correlation values are output from the enable D flip-flop ED1 (ED2, ED3) as filter coefficients of the variable coefficient filter 111 (110, 112). However, when the synchronization detecting signal SYC is at logical level "0," i.e., when the synchronization signal is no longer detected, the enable D flip-flop ED1 (ED2, ED3) stops fetching the accumulation results from the adder AD1 (AD2, AD3), and outputs the accumulation results fetched at the previous time as the filter coefficients While the synchronization detecting signal SYC is at logical level "0."

While the synchronization detecting circuit 150 in the foregoing embodiments is configured to detect a synchronous state based on a read sample value sequence after crosstalk has been removed therefrom, the present invention is not limited to this particular detecting method. Alternatively, the detection of synchronous state/asynchronous state may be performed, for example, from a read sample value sequence SB before crosstalk is removed. Further alternatively, the detection of synchronous state/asynchronous state may be performed on the basis of whether or not the PLL circuit 10 is in a locked state.

Also, while the crosstalk removing circuit 400 is configured to remove crosstalk components using read signals simultaneously read from three recording tracks by the three reading elements "a"–"c", the present invention is not limited to this particular configuration. In essence, the crosstalk removing circuit 400 may be of any configuration as long as it can remove crosstalk components from recording tracks existing on both sides of a recording track to be read.

What is claimed is:

1. A crosstalk removing device for use in a recorded information reproducing apparatus which samples a read signal read from a recording track on a recording medium to produce a read sample value sequence, and removes from the read sample value sequence crosstalk from tracks adjacent to said recording track to produce a crosstalk removed read sample value sequence, said crosstalk removing device comprising:

a filter coefficient calculating circuit for calculating filter coefficients which force an error value present in said crosstalk removed read sample value sequence to converge to zero;

a variable coefficient filter for filtering said read sample value sequence based on said filter coefficients to produce crosstalk components from the adjacent tracks of said recording track;

a subtractor for subtracting said crosstalk components from said read sample value sequence to output the difference as said crosstalk removed read sample value sequence; and means for providing predetermined fixed coefficient values as filter coefficients of said variable coefficient filter instead of said filter coefficients calculated by said filter coefficient calculating circuit during a time period in which said read sample value sequence remains in an asynchronous state.

2. A crosstalk removing device for use in a recorded information reproducing apparatus according to claim 1, wherein said error value is a difference between a sample value in said crosstalk removed read sample value sequence at zero cross time and zero.

3. A crosstalk removing device for use in a recorded information reproducing apparatus according to claim 1, wherein said filter coefficient calculating circuit includes:

a correlation calculating circuit for calculating correlations between said error value and said read sample value sequence to derive correlation values; and an integrator for accumulating said correlation values to output the accumulated correlation values as said filter coefficients.

4. A crosstalk removing device for use in a recorded information reproducing apparatus which samples a read signal read from a recording track on a recording medium to produce a read sample value sequence, and removes from the read sample value sequence crosstalk from tracks adjacent to said recording track to produce a crosstalk removed read sample value sequence, said crosstalk removing device comprising:

a filter coefficient calculating circuit for calculating filter coefficients which force an error value present in said crosstalk removed read sample value sequence to converge to zero;

an averaging circuit for calculating averages of said filter coefficients to derive average filter coefficients;

a variable coefficient filter for filtering said read sample value sequence based on said filter coefficients to produce crosstalk components from the adjacent tracks of said recording track;

a subtractor for subtracting said crosstalk components from said read sample value sequence to output the difference as said crosstalk removed read sample value sequence; and means for providing said average filter coefficients as filter coefficients of said variable coefficient filter instead of said filter coefficients calculated by said filter coefficient calculating circuit during a time period in which said read sample value sequence remains in an asynchronous state.

5. A crosstalk removing device for use in a recorded information reproducing apparatus according to claim 4, wherein said error value is a difference between a sample value in said crosstalk removed read sample value sequence at zero cross time and zero.

6. A crosstalk removing device for use in a recorded information reproducing apparatus according to claim 4, wherein said filter coefficient calculating circuit includes:

a correlation calculating circuit for calculating correlations between said error value and said read sample value sequence to derive correlation values; and an integrator for accumulating said correlation values to output the accumulated correlation values as said filter coefficients.

7. A crosstalk removing device for use in a recorded information reproducing apparatus which samples a read signal read from a recording track on a recording medium to produce a read sample value sequence, and removes from the read sample value sequence crosstalk from tracks adjacent to said recording track to produce a crosstalk removed read sample value sequence, said crosstalk removing device comprising:

a filter coefficient calculating circuit for calculating filter coefficients which force an error value present in said crosstalk removed read sample value sequence to converge to zero;

a variable coefficient filter for filtering said read sample value sequence based on said filter coefficients to produce crosstalk components from the adjacent tracks of said recording track;

a subtractor for subtracting said crosstalk component from said read sample value sequence to output the difference as said crosstalk removed read sample value sequence; and means, operative when said read sample value sequence transitions from a synchronous state to an asynchronous state, for holding filter coefficients previously derived in said filter coefficient calculating circuit until immediately before said read sample value sequence transitions to the asynchronous state to provide the held filter coefficients as the filter coefficients of said variable coefficient filter.

8. A crosstalk removing device for use in a recorded information reproducing apparatus according to claim 7, wherein said error value is a difference between a sample value in said crosstalk removed read sample value sequence at zero cross time and zero.

9. A crosstalk removing device for use in a recorded information reproducing apparatus according to claim 7, wherein said filter coefficient calculating circuit includes:

a correlation calculating circuit for calculating correlations between said error value and said read sample value sequence to derive correlation values;

an integrator for accumulating said correlation values to output the accumulated correlation values as said filter coefficients; and a switch for forcibly blocking said correlation values from being supplied to said integrator when said read sample value sequence transitions from a synchronous state to an asynchronous state.

* * * * *